No. 807,372. PATENTED DEC. 12, 1905.
A. GILLIES.
PNEUMATIC TEAT CUP.
APPLICATION FILED JUNE 26, 1905.
2 SHEETS—SHEET 1.
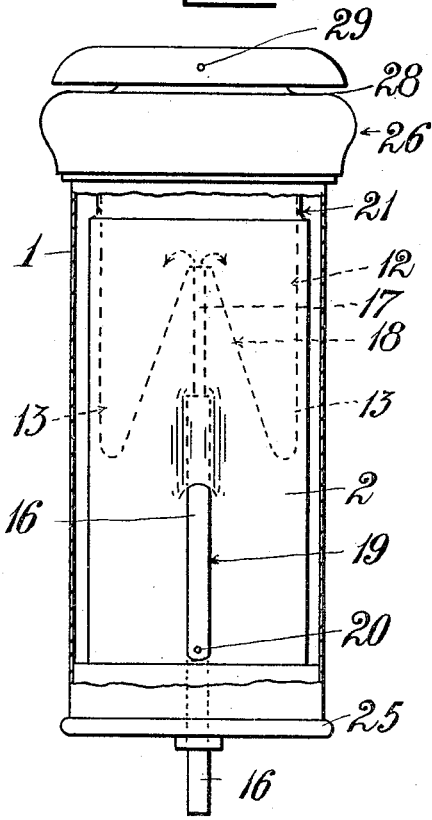
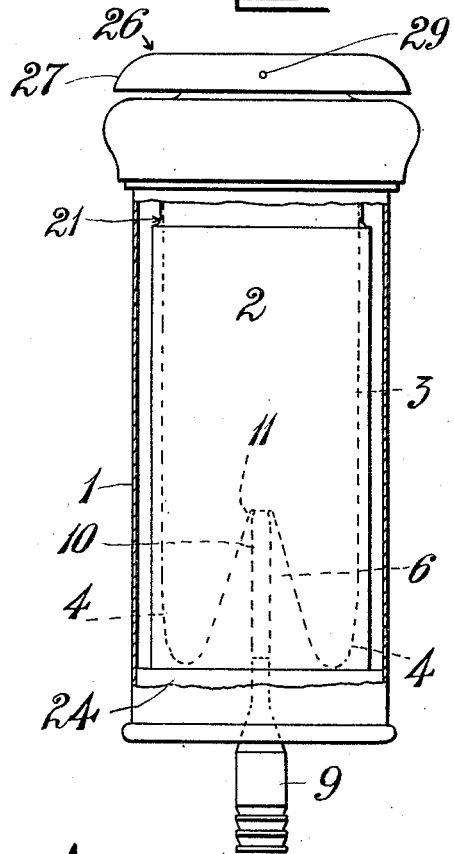
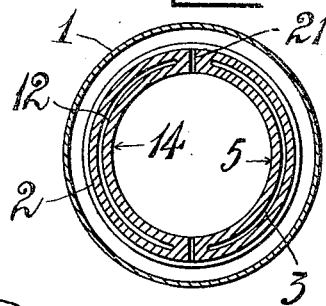
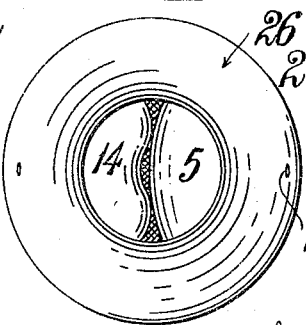
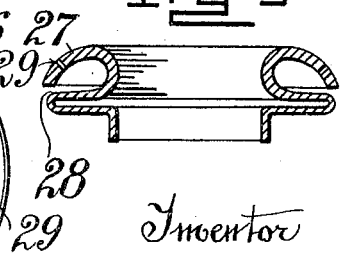
Witnesses
Walter C. Hart
William J. Harris
Inventor
Alexander Gillies
by Edw Walters + Son.
Attorneys No. 807,372. PATENTED DEC. 12, 1905.
A. GILLIES.
PNEUMATIC TEAT CUP.
APPLICATION FILED JUNE 26, 1905.
2 SHEETS—SHEET 2.
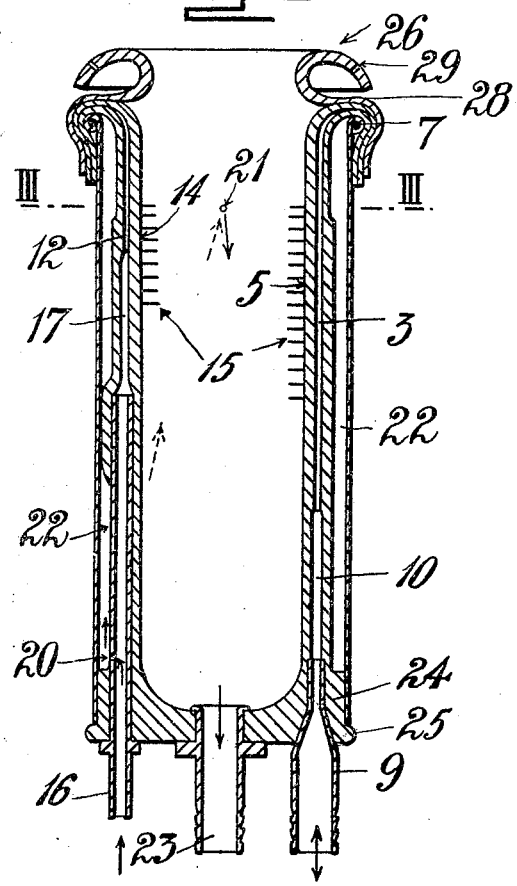
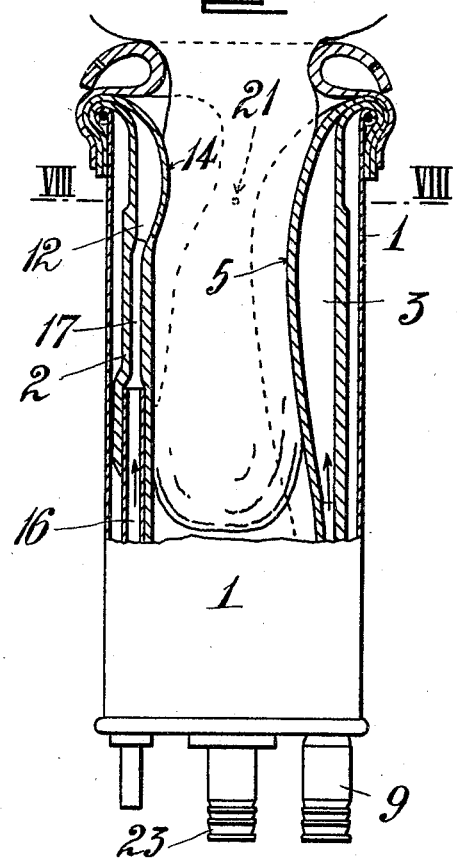
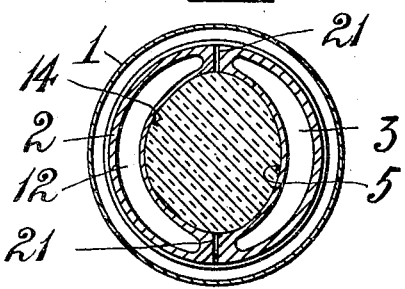
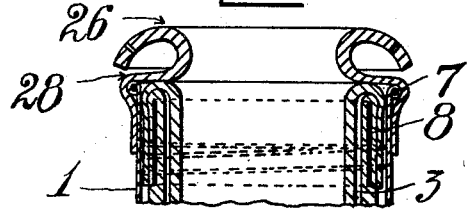
Inventor
Alexander Gillies

UNITED STATES PATENT OFFICE.

ALEXANDER GILLIES, OF FERANG, VICTORIA, AUSTRALIA.

PNEUMATIC TEAT-CUP.

No. 807,372.  Specification of Letters Patent.  Patented Dec. 12, 1905.

Application filed June 26, 1905. Serial No. 267,123.

*To all whom it may concern:*

Be it known that I, ALEXANDER GILLIES, dairyman, a subject of the King of Great Britain, residing at Ferang, in the State of Victoria, Australia, have invented certain new and useful Improvements in Pneumatic Teat-Cups, of which the following is a specification.

This invention relates to pneumatic teat-cups in which a continuous low-pressure suction is employed in the inner chamber of the teat-cup in order to convey the milk therefrom to the receptacle, while an intermittent pressure acts on the teat in order to simulate as closely as possible the natural action of the calf when sucking, and thus induce the cow to give down the milk freely.

Furthermore, my teat-cup is so designed that it can be readily applied and removed from the teat without any straining or other injurious or unpleasant effect to the cow and when once in position is maintained there without risk of its accidental disengagement.

In order to facilitate a clear understanding of the invention, reference will be made to the following drawings, whereof—

Figure 1 is a side elevation of a teat-cup, with the rigid shell broken away, embodying my improvements; and Fig. 2, a similar view taken from the opposite side. Fig. 3 is a horizontal section on line III III, Fig. 6. Fig. 4 is a plan of the cup removed from the teat, showing the "tongue" and "gum" distended. Fig. 5 is a transverse section through the mouthpiece of the cup shown detached therefrom. Fig. 6 is a central vertical section of the teat-cup; and Fig. 7, a vertical central section, partly in elevation, showing the cup attached to a cow's teat. Fig. 8 is a horizontal section on line VIII VIII, Fig. 7; and Fig. 9 is a central vertical section through the upper end of the cup, showing a modification.

According to this invention, within the rigid outer shell 1 is placed an inner rubber tubular casing 2, which is molded or cut longitudinally and parallel with its periphery, so as to form a double thin wall, with an air-space or cavity 3 between for approximately half the circumference, as shown in Figs. 2, 3, and 6. The cavity extends downwardly to within a short distance of the base of the casing and tapers off at the bottom into a pair of V-shaped ends 4 and forms with the walls an inflatable bag 5, which resembles as nearly as possible the shape of a calf's tongue.

The object of the comparatively rigid triangular part 6 of the casing between the V-shaped ends 4 of the cavity is to prevent said casing from yielding inwardly at this point, so that the inflation will take place on either side thereof in the V-shaped ends, and so tend to form a central longitudinal depression in the tongue similar to that assumed by the calf's tongue when sucking, as shown in Figs. 7 and 8.

The upper edges of the bag or tongue 5 are closed, preferably by being sprung over the upper end of the rigid shell, which is here conveniently provided with a shoulder 7, or said upper edges may be turned over a flat metal ring 8 and secured by wire or otherwise, Fig. 9, when the casing is simply inserted in the shell, so that its upper end is about flush with the shoulder thereof. With this latter construction the casing is not so liable to stretch, and there is less wear and tear generally; but with the former means a more perfect vacuum is preserved between the shell and the casing.

The tongue 5 is connected with any known pulsator—as, for instance, the "Lawrence and Kennedy"—by means of a short tube 9, which passes through the base of the casing and extends upwardly into a passage 10, cut through the apex 11 of the triangular part 6 thereof. By means of the pulsator the tongue is intermittingly exhausted and inflated, whereby the teat is partially surrounded and squeezed, and the milk is extracted therefrom in a natural manner. Diametrically opposite the upper end of this tongue or bag 5 the casing is cut or slit longitudinally and parallel with its periphery, thus forming another cavity 12, which, however, only extends a very short distance in a downward direction and is tapered off at its lower end into two V-shaped legs 13, Fig. 1, and closed at its upper end in a manner similar to the above-mentioned tongue, the whole comprising a small inflatable gum 14, the object of which is to grip the teat and hold same in the proper position for milking. The inner surfaces of both these inflatable parts—*i. e.*, tongue and gum—are ribbed or roughened, as at 15, like a calf's mouth, so as to enable the teat to be more securely gripped.

The inflatable gum 14 is in permanent direct communication with the atmosphere by means of a tube 16, which extends through the base of the casing and is embedded in the wall thereof for part of its length. The upper end of said tube communicates with a passage 17 in the triangular part 18, formed between the legs 13 of the cavity 12, and its central part protrudes on one side through a slit 19 in the casing and is provided with a pin-hole 20 through said side. Through the casing and near the upper end thereof are holes 21, forming a direct communication with the space 22, between the shell 1 and the rubber casing 2 and that of the interior of said casing. Hence the constant vacuum in this latter chamber draws in a sufficient quantity of air through tube 16, pin-hole 20, and holes 21 to facilitate the passage of the milk through the milk-tube 23 to its receptacle.

When the vacuum is applied to the interior of the casing, the inflatable gum 14 distends toward and partially round the teat by reason of the atmospheric pressure admitted through the tube 16, thus insuring a steady grip on the teat. Furthermore, when it is required to adjust its position on the teat the air-tube 16 is closed by placing a finger over its open bottom end. This causes the air in the inflated gum to be drawn through the pin-hole 20 and holes 21, so that the walls of said gum collapse against the sides of the shell, and thus release the grip on the teat.

In order to remove the cup from the teat, the vacuum in the milk-tube 23 and pulsator-tube 9 is cut off, thus allowing air to enter the casing through the holes 21, which causes the gum 14 to collapse, so that the cup may be readily removed from the teat.

Through the center of the base 24 of the casing protrudes the continuous-suction milk-tube 23, which is in communication with the milk-receptacle.

The base 24 has a greater diameter than the casing itself, and the lower end of the rigid shell 1 is seated on a laterally-projecting flange 25, formed on the bottom of said base, so that a space is provided between said shell and the inner tubular casing which is put in direct communication, as aforesaid, with the vacuum by means of the holes 21 made in the sides of said casing. By this means all the air is drawn away from between the adjacent surfaces thereof, and practically an air-tight joint is obtained. Over the upper end of said shell is sprung a circular mouthpiece 26, the upper edge of which is curved outwardly and downwardly and forms a flange 27, approximately U-shaped in cross-section, Fig. 5, which rests when in use upon an annular shoulder 28 and is formed, preferably, of comparatively thicker rubber than the other portion of said mouthpiece. In order to prevent a vacuum forming between the flange 27 and shoulder 28, said flange is pierced with holes 29, thus admitting atmospheric pressure to the under side thereof. The advantage of a mouthpiece so formed is that it will not collapse inwardly, as is common with ordinary mouthpieces, which have an inwardly-projecting flange.

When the edges of the casing-walls are sprung over the shoulder 7 of the shell, as in Fig. 6, the mouthpiece is stretched over the said edges; but when the casing is wholly inside the shell, as in Fig. 9, the cap is sprung directly over the shoulder 7 of the shell.

One of the advantages of a teat-cup as above described is that it may be readily taken to pieces for cleaning purposes.

Having now particularly described and ascertained the nature of my said invention and in what manner the same is to be performed, I declare that what I claim is—

1. In pneumatic teat-cups, an inner casing having an inflatable "tongue" extending almost the entire length of the cup on one side in combination with a comparatively short inflatable "gum" on the opposite side and near the mouth of the cup and arranged substantially as and for the purposes set forth.

2. In pneumatic teat-cups a long inflatable "tongue" formed by splitting the wall of the inner casing down one side in combination with a short inflatable "gum" on the opposite side to said "tongue" formed by similarly splitting the wall of the inner casing, said "tongue" being connected to the pulsator and the "gum" open to the atmosphere, and a constant vacuum within the casing substantially as set forth.

3. In pneumatic teat-cups a long inflatable "tongue" formed by splitting the wall of the casing from the top longitudinally and parallel with its periphery for about half its circumference and forming a cavity between having a pair of V-shaped ends near the base on each side of a comparatively rigid triangular part, said cavity being closed at the top and a tube in communication with a pulsator extending through the base of the casing and passing through the apex of the triangular part substantially as set forth.

4. In pneumatic teat-cups an inflatable "gum" formed near the mouth of the casing and on one side thereof and in permanent communication with the atmosphere substantially as and for the purposes set forth.

5. In pneumatic teat-cups a short inflatable "gum" formed near the mouth of the cup by splitting the wall of the casing from the top longitudinally and parallel with its periphery for about half its circumference and forming a cavity between, having a pair of V-shaped legs on either side of a comparatively rigid triangular part, said cavity being closed at the top and open at the bottom to the atmosphere by means of a tube communicating with a passage extending through the apex of the triangular part substantially as set forth.

6. In pneumatic teat-cups an outer shell and an inner flexible casing having a tube extending upwardly through the wall of said casing to the inflatable "gum" and in open communication with the atmosphere at its lower end, said tube having a pin-hole on one side thereof communicating with the space between the rigid shell and the flexible casing and casing having holes pierced through the wall thereof at its upper end and a constant vacuum therein substantially as set forth.

7. In pneumatic teat-cups, a rigid shell and a circular mouthpiece sprung thereover, said mouthpiece being substantially U-shaped in cross-section and having holes therethrough.

8. In pneumatic teat-cups, a rigid shell, a split casing in the shell, a flat metal ring fitted around the casing and over which the edges of said casing are turned, said ring being fitted in the shell, and a circular mouthpiece sprung over said shell.

In testimony whereof I have hereunto set my hand in presence of two subscribing witnesses.

ALEXANDER GILLIES.

Witnesses:
EDWARD NEEDHAM WATERS,
WALTER CHARLES HART.